United States Patent Office 3,210,415
Patented Oct. 5, 1965

3,210,415
DECARBOXYLATION OF 2,3,5,6-TETRACHLORO-TEREPHTHALIC ACID
Reynold A. Berkey, Painesville, and Henry Bluestone, University Heights, Ohio, assignors to Diamond Alkali Company, Cleveland, Ohio, a corporation of Delaware
No Drawing. Filed Aug. 23, 1963, Ser. No. 304,257
4 Claims. (Cl. 260—522)

This invention relates to the preparation of 2,3,5,6-tetrachlorobenzoic acid and salts thereof.

This application is a continuation-in-part of our co-pending application, Serial No. 849,138, filed October 28, 1959, now abandoned.

2,3,5,6-tetrachlorobenzoic acid and its salts are recognized as herbicides and exhibit singularly effective herbicidal activity against a variety of weed species.

In many instances, 2,3,5,6-tetrachlorobenzoic acid heretofore has been relatively difficult to prepare, especially when the pure acid or certain salts thereof were desired.

Accordingly, the principal object of the present invention is to provide a new and improved method of preparing 2,3,5,6-tetrachlorobenzoic acid and its salts.

A further object of the invention is to provide a simple and economical method of preparing 2,3,5,6-tetrachlorobenzoic acid and its salts.

The present invention comprises the process of preparing 2,3,5,6-tetrachlorobenzoic acid by monodecarboxylating tetrachloroterephthalic acid. Tetrachloroterephthalic acid is reported, for example, in volume IX, page 848 of Beilstein's "Organische Chemie."

The process of this invention may be indicated by the following reaction:

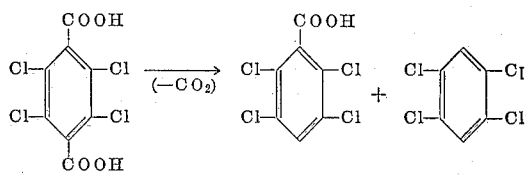

In practice, the process is effected by heating, at substantially atmospheric pressure and in the absence of water or of any catalyst to accelerate decarboxylation, tetrachloroterephthalic acid at an elevated temperature up to and including that sufficient to melt the said halogenated terephthalic acid, i.e., at a temperature typically within the range of about 270° to 330° C., and preferably, from 290° to 310° C.; continuing the heating process for a time sufficient to monodecarboxylate, with the evolution of carbon dioxide therefrom, the said tetrachlorophthalic acid to the desired tetrachlorobenzoic acid in substantial yield; and finally recovering the 2,3,5,6-tetrachlorobenzoic acid product.

As will be illustrated hereinafter by a specific example, the process of this invention is carried out at substantially atmospheric pressure, employing reaction vessels, e.g., glass resin flasks and the like, which cannot be used at high pressure. Because of atmospheric pressure conditions employed herein, the process of this invention can be conducted more conveniently, safely and economically than heretofore known processes for preparing 2,3,5,6-tetrachlorobenzoic acid, since these previously known processes are carried out at superatmospheric pressures, utilizing metallic autoclaves or other similar type pressure equipment.

Likewise, in contrast to previously known processes, the process of this invention is carried out in the absence of water. Additionally, no catalyst to accelerate decarboxylation is required. Depending upon the reaction temperature employed, the heating period is effected for a period of 5 minutes to an hour. When maintained at temperatures in the upper limits of the temperature range described previously above, i.e., at temperatures of 290° to 310° C., the reaction is preferably conducted for a time period of 15 minutes or less, especially if sufficient agitation is provided to the acid material.

The decarboxylation reaction, as shown structurally above, is effected with the evolution of no more than 1.5 moles, preferably 1 mole of carbon dioxide per mole of tetrachloroterephthalic acid employed. When the said terephthalic acid has been monodecarboxylated to the desired chlorobenzoic acid in substantial yield, the evolution of $CO_2$ gas diminishes and there is a drop in the reaction temperature. Heating is then discontinued.

The desired 2,3,5,6-tetrachlorobenzoic acid is readily recovered from the reaction mixture comprising the desired product and 1,2,4,5-tetrachlorobenzene, by cooling the mixture, extracting it with a water-soluble alkali, e.g., $NH_4OH$, $NaOH$, $Na_2CO_3$, or the like, and then subsequently acidifying the alkaline extract material with an inorganic acid such as $H_2SO_4$, $HCl$, $HNO_3$, $HI$, $HBr$, or the like to precipitate out the extracted tetrachlorobenzoic acid product. It will be recognized, of course, that by omitting the acidification step, a salt of the desired acid is obtained which in some instances may be used as such.

In practice, in many instances, it is advantageous to add to the reaction mixture, prior to cooling said mixture to ambient temperature, an inert liquid such as a paraffin oil, kerosene, methylated naphthalene or the like to prevent formation of a solid cohesive product mass. This oil, preferably a higher boiling hydrocarbon, e.g., B.P. greater than 200° C., can easily be removed from the reaction mixture prior to extraction by washing the mixture with a hydrocarbon solvent such as heptane, hexane, or petroleum ether fractions.

Purification of the acid product by recrystallization, e.g., from toluene, is, of course, feasible if a high purity is desired.

Preparation of the desired acid salts can be carried out by treating the acid with a desired compound containing the intended salt-forming element.

The following examples describe certain ways in which the principle of the invention has been applied but are not to be construed as limiting its scope.

EXAMPLE 1

2,3,5,6-tetrachlorobenzoic acid

Tetrachloroterephthalic acid (876 g., 2.88 moles) in a 2-liter resin flask fitted with a stirrer, thermometer, and a condenser, is heated by means of an electric mantle while stirring. At 290° C., the contents of the flask are all melted, and there is a rapid evolution of $CO_2$ gas as the temperature is increased to 305° C. In about ten minutes, the gas evolution diminishes and the temperature drops somewhat due to the refluxing of 1,2,4,5-tetrachlorobenzene.

The reaction mixture is cooled to about 200° C., paraffin oil (100 ml.) is added and mixed thoroughly. The mixture is then poured into a metal dish, allowed to cool, and pulverized. The paraffin oil is washed out of the solid with 500 ml. of petroleum ether (B.P. 35° to 65° C.), and the dried solid again is pulverized. The solid (mixture of 1,2,4,5-tetrachlorobenzene and 2,3,5,6-tetrachlorobenzoic acid) is exhaustively extracted with 10-percent aqueous $NH_4OH$ to remove all the base-soluble material and the insoluble tetrachlorobenzene removed by filtration. The filtrate is acidified with sulfuric acid to precipitate crude 2,3,5,6-tetrachlorobenzoic acid. The yield of acid melting at 175° to 180° C. is 478 g. (64 percent). Recrystallization from toluene gives a product which melts at 181° to 182.5° C., and whose melting point does not depress when mixed with an authentic sample.

*Analysis for* $C_7H_2Cl_4O_2$

|  | Calculated | Found |
|---|---|---|
| Carbon, percent | 32.35 | 32.5 |
| Hydrogen, percent | 0.78 | 0.9 |
| Neut. eq | 260 | 256 |

EXAMPLE 2

*2,3,5,6-tetrachlorobenzoic acid, sodium salt*

A mixture of 26 parts of 2,3,5,6-tetrachlorobenzoic acid in 100 parts of water is treated with 4 parts of sodium hydroxide in small portions. After the reaction subsides, the clear solution is evaporated to dryness on a steam bath in vacuo to yield essentially pure 2,3,5,6-tetrachlorobenzoic acid, sodium salt.

The following metal salts are prepared in accordance with this procedure by substituting for the sodium hydroxide stoichiometric equivalent amounts of the hydroxides of the metal ions of the following compounds:

2,3,5,6-tetrachlorobenzoic acid, potassium salt
2,3,5,6-tetrachlorobenzoic acid, calcium salt
2,3,5,6-tetrachlorobenzoic acid, barium salt

EXAMPLE 3

*2,3,5,6-tetrachlorobenzoic acid, dimethylamine salt*

Dimethylamine is metered into a well-stirred solution consisting of 150 parts by weight of ethanol and 30 parts by weight of 2,3,5,6-tetrachlorobenzoic acid in a flask fitted with a reflux condenser. The addition of the amine is discontinued when a test paper held above the surface of the solution shows an alkaline reaction. The ethanol and slight excess of dimethylamine are removed by distillation. The residue consists of essentially pure 2,3,5,6-tetrachlorobenzoic acid, dimethylamine salt.

In accordance with this synthesis, amine salts of 2,3,5,6-tetrachlorobenzoic acid with ammonia, monomethylamine, trimethylamine, monoethylamine, diethylamine, triethylamine, monopropylamine, dipropylamine, monobutylamine, diisobutylamine, n-hexylamine, amylamine, methyldiethylamine, methylethylamine, methyldipropylamine, butylisopropylamine, monoethanolamine, isopropanolamine, dimethylisobutanolamine, n-hexanolamine, ethylenediamine and propylenediamine are prepared by substituting molecular equivalent amounts of these amines for the dimethylamine in the above synthesis.

It is to be understood that although the invention has been described with specific reference to particular embodiments thereof, it is not to be so limited, since changes and alterations therein may be made which are within the full intended scope of this invention as defined by the appended claims.

What is claimed is:

1. A method of preparing 2,3,5,6-tetrachlorobenzoic acid which comprises monodecarboxylating tetrachloroterephthalic acid by heating at atmospheric pressure in the absence of water and of a decarboxylation catalyst the said tetrachloroterephthalic acid to a temperature within the range of about 270° to 330° C., with agitation, for a period of about 5 minutes to 1 hour.

2. A method of preparing 2,3,5,6-tetrachlorobenzoic acid which comprises heating, at atmospheric pressure in the absence of water and of a decarboxylation catalyst, tetrachloroterephthalic acid to a temperature within the range of about 270° to 330° C., with agitation, for a period of about 5 minutes to 1 hour to evolve from 1 to 1.5 moles of carbon dioxide per mole of tetrachloroterephthalic acid.

3. The method, according to claim 2, in which 1 mole of carbon dioxide is evolved per mole of the said tetrachloroterephthalic acid.

4. The method according to claim 2 in which the desired acid is separated from the reaction mixture by cooling and extracting said mixture with a water-soluble alkali selected from the group consisting of $NH_4OH$, $NaOH$ and $Na_2CO_3$; and thereafter precipitating the desired acid from the extracted material by acidifying the said extracted material with an inorganic acid.

References Cited by the Examiner

UNITED STATES PATENTS

| 1,953,231 | 4/34 | Jaeger | 260—522 |
| 2,020,505 | 11/35 | Jaeger | 260—522 |
| 2,439,237 | 4/48 | Cass | 260—522 |

LORRAINE A. WEINBERGER, *Primary Examiner.*